May 12, 1925. 1,537,198
W. E. SOLDNER
MINIATURE AUTOMOBILE FOR EXHIBITION PURPOSES
Filed April 12, 1924 3 Sheets-Sheet 1
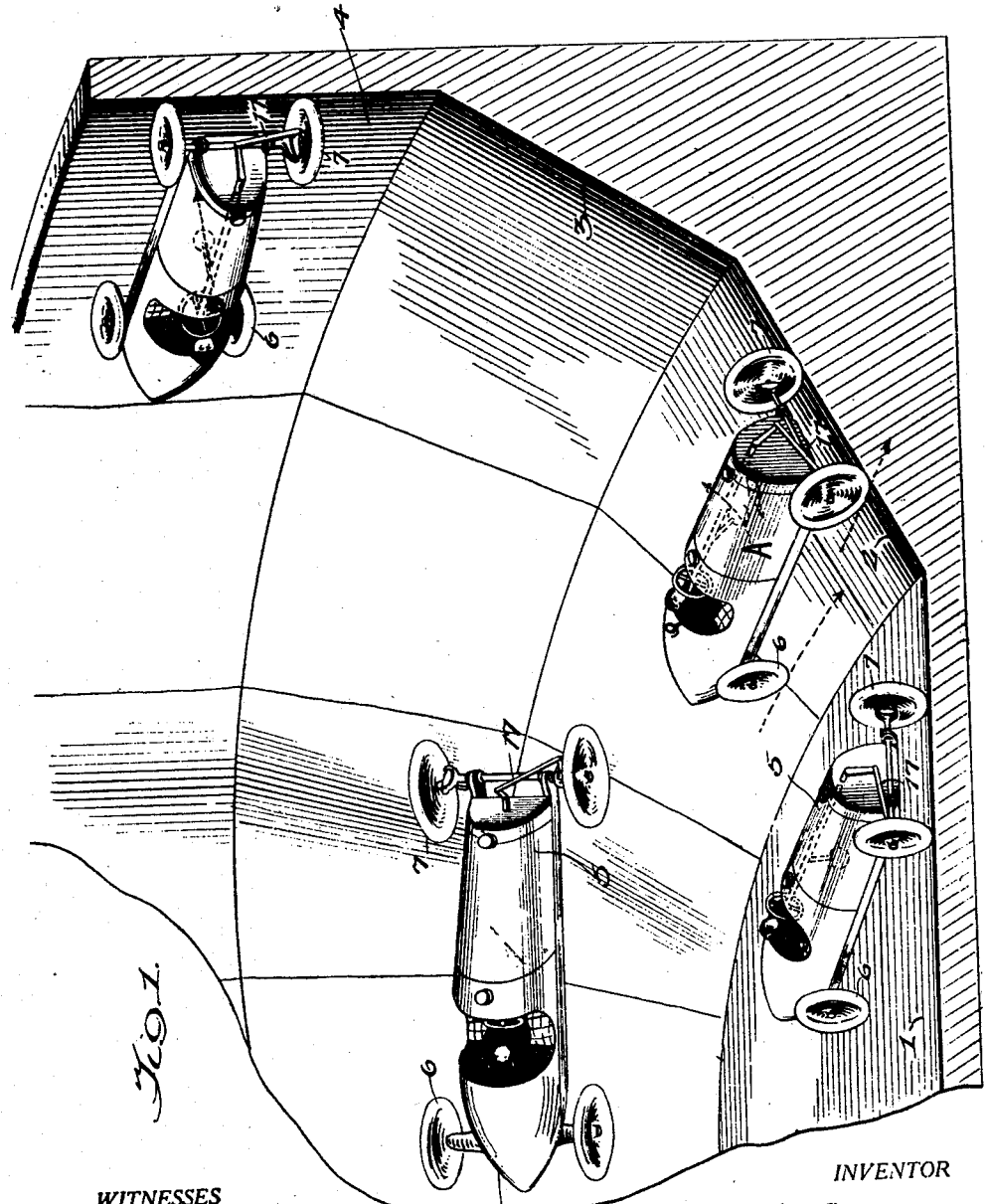
WITNESSES
INVENTOR
W. E. SOLDNER,
BY
ATTORNEYS

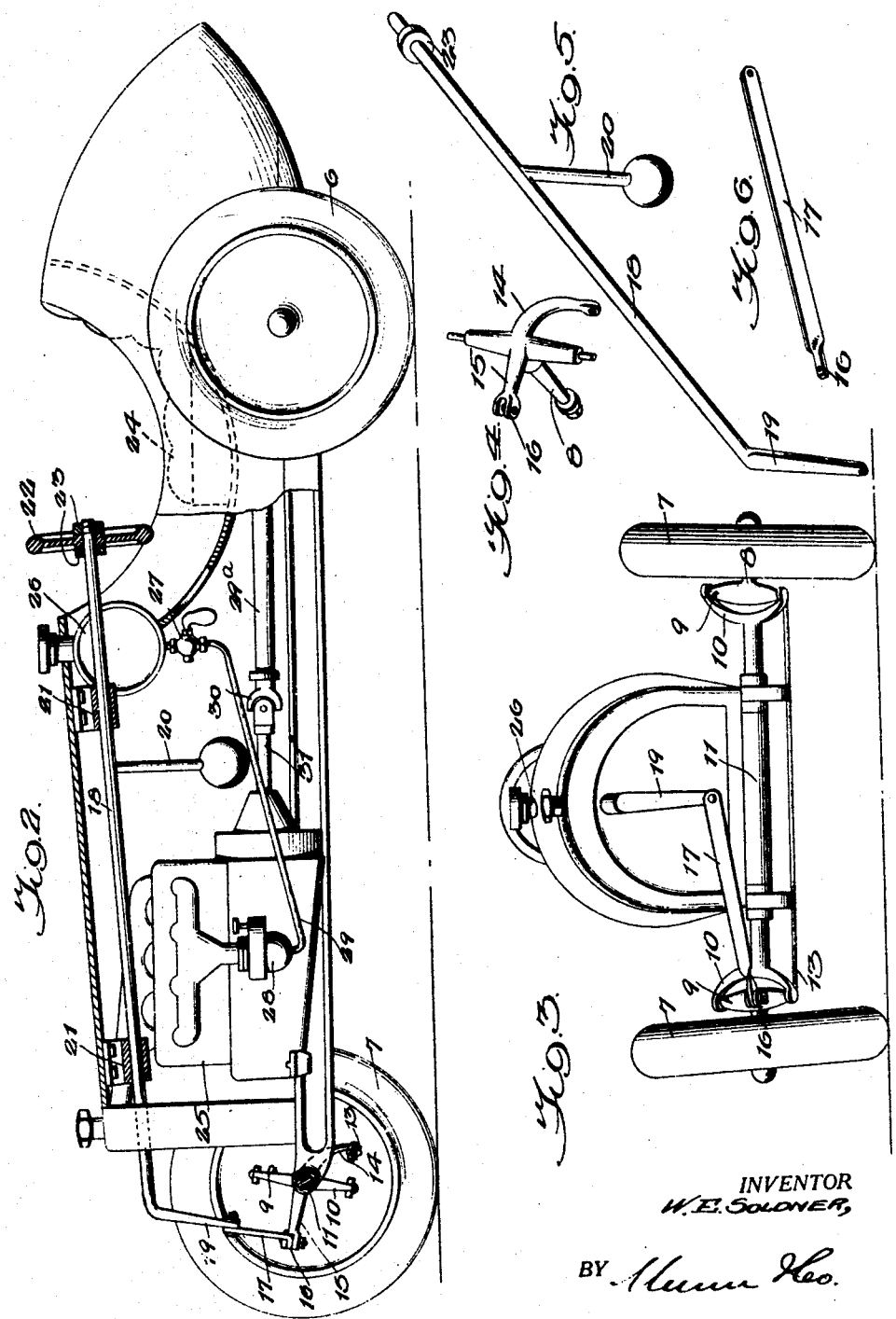

May 12, 1925.
W. E. SOLDNER
1,537,198
MINIATURE AUTOMOBILE FOR EXHIBITION PURPOSES
Filed April 12, 1924 3 Sheets-Sheet 3
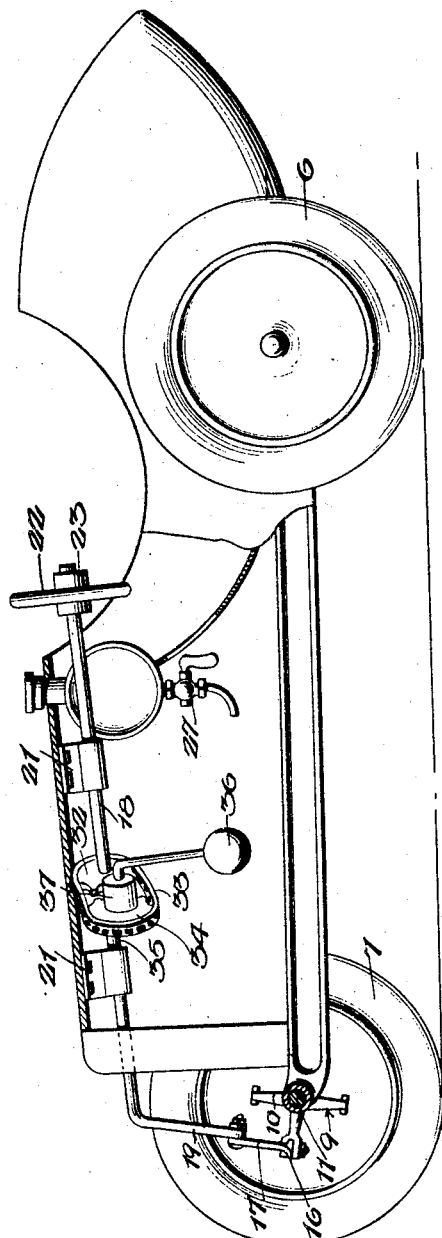
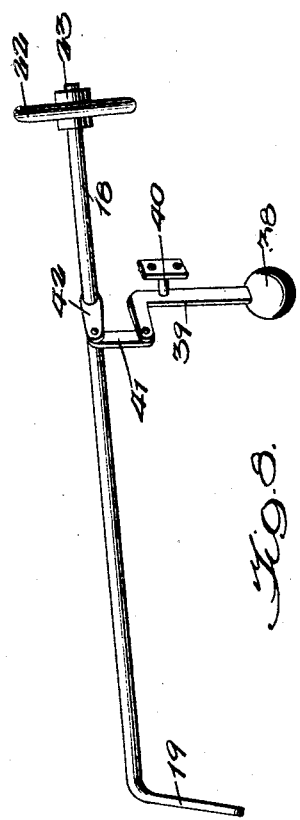
WITNESSES
INVENTOR
W. E. Soldner,
BY
ATTORNEYS Patented May 12, 1925.

1,537,198

UNITED STATES PATENT OFFICE.

WILLIAM EDWARD SOLDNER, OF SALINA, KANSAS.

MINIATURE AUTOMOBILE FOR EXHIBITION PURPOSES.

Application filed April 12, 1924. Serial No. 706,215.

*To all whom it may concern:*

Be it known that I, WILLIAM E. SOLDNER, a citizen of the United States, and resident of Salina, in the county of Saline and State of Kansas, have invented certain new and useful Improvements in Miniature Automobiles for Exhibition Purposes, of which the following is a specification.

My invention relates to improvements in miniature automobiles and it consists of constructions, combinations and arrangements herein described and claimed.

An object of the invention is to provide a miniature automobile which is used particularly as an amusement device at public exhibitions or wherever entertainment may be purveyed, the mechanism of the automobile being of such a nature that the automobile is automatically guided around a motordrome, it appearing however, that an animal sitting in the automobile is doing the guiding and operating.

Another object of the invention is to provide a vehicle which has means operated by the effect of gravity and centrifugal force to steer the vehicle either downward or upward over an inclined surface, as a race track, depending on whether the speed of the vehicle is slowing or becoming more rapid.

Other objects and advantages will appear in the following specification, reference being had to the accompanying drawings, in which:

Figure 1 is a perspective view of a portion of a race track or motordrome illustrating the various positions assumed by the vehicle as it traverses the course.

Figure 2 is a longitudinal section, partly in elevation of an automobile with the automatic steering apparatus, Figure 3 is a front elevation, Figure 4 is a detail perspective view of one of the steering knuckles, Figure 5 is a detailed perspective view of the steering rod and pendulum, Figure 6 is a detailed perspective view of the connecting link, Figure 7 is a diagrammatic section illustrating the use of gearing for indirectly connecting the pendulum with the steering rod, Figure 8 is a diagrammatic perspective view illustrating the use of levers for making the indirect connection.

It should be explained, by way of preface, what the invention is for. It is intended primarily as an amusement device, a wild, tame or domesticated animal, for example a monkey, being seated in the vehicle whereupon the motor or engine is started and the vehicle made to traverse a circular course. The course around which the vehicle is intended to run is either circular or oval and has a sloping floor like the ordinary race track, or better still, the course consists of a motordrome which includes a perpendicular wall around which the vehicle runs when at full speed.

Reference to the accompanying drawing will clearly emphasize the foregoing statements. Figure 1 illustrates a portion of a motordrome or race track which comprises the floor 1, first incline 2, second incline 3, and the perpendicular wall 4. The inclines 2 and 3 are not necessarily at decided angles as shown but may be gradually merged into one, or may be resolved into a perfectly flat or cylindrical incline, in the event of inclines 2 and 3 being resolved into a perfectly flat incline there will be only three surfaces traversible by the motor vehicle instead of four as illustrated.

An automobile 5 is employed as the particular motor vehicle, although motor vehicles of other types, for example, three wheeled motor cycles, may be used. The four automobiles illustrated in Figure 1 are intended to be regarded by the reader as one and the same. The four are shown merely to illustrate the various positions assumed by the automobile in traversing the race course or motordrome. The automobile has four wheels; two rear wheels 6 and two front wheels 7.

Each of the front wheels is mounted to turn on the spindle 8 of a steering knuckle 9. The steering knuckles in turn, are mounted to turn in yokes 10 of the front axle structure 11. The front axle structure 11 is pivoted near its center to the chassis 12 of the automobile. The rear axle is suitably attached to the chassis 12 of the automobile 5.

A reach rod 13 connects suitable arms 14 of the steering knuckles, the obvious purpose being that there shall be a correspondence of movement of both front wheels when the steering knuckle at one side is turned. For this purpose one of the steering knuckles has a link arm 15 (Fig. 4) which is bifurcated at 16 to receive the connecting link 17 of the steering rod 18. The steering rod has an arm 19, visible at the front of the automobile to which one end of the link 17 is pivotally joined.

A pendulum 20, connected to the steering rod 18 either directly, as in Figures 2 and 5, or indirectly as in Figures 7 and 8, automatically causes steering of the automobile 5 while the latter is in motion. When the automobile is standing still or is running down, the action of gravity on the pendulum 20 predominates over the centrifugal force with the result that the steering wheels 7 are gradually turned inwardly in respect to the motordrome and the automobile is guided toward the floor 1. On the contrary, if the automobile is gaining speed the centrifugal force predominates over the action of gravity on the pendulum 20 with the result that the steering wheels are turned outwardly and the automobile is guided toward the peripheral wall 4 of the motordrome.

Bearings 21 support the steering rod 18 for limited turning inside of the automobile. The arrangement is clearly shown in Figure 2. The rod 18 carries a steering wheel 22 which may be held either loosely or clamped tightly to rod 18 by means of collars 23, one of which is fixed, the other threaded and locked.

A gasoline engine or motor furnishes the driving power for the automobile. In this case a gasoline engine 25 is used, the engine having usual spark and carburetor controls (not shown) as in actual practice. The engine is supplied with fuel from a small supply tank 26 through a shut-off cock 27 to the carburetor 28 by means of tubing 29. The driving power of the engine is transmitted to the rear wheels of the automobile in any suitable manner, use being made in this particular instance of a shaft $29^a$ which has a universal joint connection 30 with the shaft 31 of the engine. It is regarded as optional whether the power of the engine be transmitted by a shaft, chains, or otherwise.

It is to be observed, particularly in Figure 2, that the steering knuckles 9 are canted, the particular angle adopted is a matter for future determination. The angle may be greater or less than that illustrated, actual practice determining such. The purpose in canting the steering knuckles is to make the action of the steering wheels 7 more stable. Instead of letting the steering wheels turn with absolute freedom it is desired that there shall be a constant requirement of an actual controlling force to hold the steering wheels in position. Obviously, the controlling force is the weighted pendulum 20, the canting of the steering knuckles in combination with the weighted pendulum actually accomplishing the purpose intended.

The connection between the steering rod 18 and the steering knuckles is to be regarded in a broad manner the provision of a connecting link 17 is merely one of the numerous means which may be adopted with equally as good results. Any one of the various commonly known types of means for transmitting motion may be installed in place of link 17 but with very little modification.

The operation.

It may be repeated that Figure 1 is not intended to illustrate that four different automobiles are used at one time. This is not usually the case: ordinarily only one is used as a time, Figure 1 merely illustrating the various positions assumed by the automobile 5 in traversing the race track from standing position on floor 1 to full speed position around the perpendicular wall 4, and vice versa.

Assume the automobile to be standing still on the floor 1. A tame or domesticated wild animal, preferably a monkey, is seated in the automobile and perhaps strapped in place, if necessary. The weighted pendulum 20 hangs straight down being thus held by the action of gravity. As a result, the steering wheels 7 are in line with the rear wheels 6.

The mechanic opens the shutoff cock 27 allowing the carburetor 28 and tubing 29 to fill with fuel, then starts the engine, then after shutting off cock 27 so no more fuel (preferably gasoline) can enter carburetor 28, he pushes the car until the engine gains a little momentum. Now the automobile, in motion under its own power, will at once make for the first inclination 2 and as it gathers speed the weighted pendulum 20 will swing outward as shown by arrow A.

The swinging of the pendulum causes a pull over on the connecting link 17 so that both steering knuckles 9 are turned simultaneously, causing the steering wheels 7 to incline outwardly and steer the automobile 5 for the second inclination 3. As the centrifugal force of the speeding automobile increases, the action of gravity on the weighted pendulum will gradually be overcome until the weighted pendulum ultimately assumes the horizontal position (see the uppermost automobile) which position is directly at right angles to that which it originally assumed.

In the interim between the two positions of the pendulum the steering wheels 7 are gradually turned outward until the final full speed running position is reached. The weighted pendulum then assumes the same position in relation to the automobile that it did when the automobile was standing still on the floor 1. This means that the steering wheels will have been drawn back into line with the rear wheels and the automobile is guided on the straightaway course. The action of centrifugal force on the automobile keeps it in place notwithstanding the fact that it is now running over the perpendicular surface.

When the fuel is used up out of the carburetor 28 the engine stops pulling; as the automobile loses speed the action of centrifugal force on the weighted pendulum becomes less and the action of gravity will predominate. The pendulum will therefore sink causing a reverse turning of the steering wheels until the automobile is finally brought to the original standing position on the floor 1.

Reference is made to Figures 7 and 8 which illustrates modified arrangements of two representative types of mechanisms for turning the steering rod 18 indirectly. Attention is first directed to Figure 7. The steering rod 18 carries a sprocket 32 which is connected by means of a chain 33 with a similar sprocket 34 on a counter-shaft 35 which, in this instance, carries the weight or pendulum 36.

A suitable bearing 37 supports the countershaft a short distance from the steering rod 18. There is a correspondence of movement between the pendulum 36 and steering rod 18 by virtue of the chain connection 33. The front wheels 7 will turn in the same direction that the pendulum 36 is rocked, exactly as in the main form of the invention.

Figure 8 illustrates the use of cranks or links to transmit the swinging movement of the pendulum 38 to the steering rod 18. The weight or bell crank 39, which is a part thereof, swings on the pivot 40. This pivot consists of a suitable bracket attached to any convenient fixed support. A link 41 connects the otherwise free end of the bell crank 39 with a simple lever 42 on the steering rod. By examining the arrows the reader will see that the steering rod will turn in the same direction that the pendulum swings, ultimately causing the front wheels of the automobile to turn in the same direction.

As stated before, the two modifications in Figs. 7 and 8 are representative types. Obviously various styles of gearing may be used in lieu of the sprockets and chain in Figure 7 with the same result. Again, various arrangements of levers and links may be used in lieu of the specific arrangement in Figure 8, also with the same result. The particular positioning of the pendulum in respect to the steering rod is subject to considerable variation and may be arranged as desired so long as the ultimate result is achieved.

I claim:—

1. A device of the character described comprising a vehicle having a rear wheel and a front steering wheel, steering means attached to the front wheel, and means upon which gravity or centrifugal force has a predominating influence according to the speed of the vehicle to automatically operate the steering wheel and thus guide the vehicle.

2. A device of the character described comprising a motor vehicle having a rear wheel and a front steering wheen, steering means associated with the front wheel, and a pendulum so mounted and connected with said steering wheel that its positions under the influence of gravity and centrifugal force according to the speed of the vehicle when traversing a laterally inclined course will automatically operate the steering means and steer the vehicle.

3. A device of the character described comprising a vehicle having a rear wheel and a front steering wheel, means upon which the front wheel is mounted including steering knuckles, a turnable shaft carried by the vehicle having a weighted pendulum assuming various positions according to the predominating influence of gravity and the action of centrifugal force to thereby turn the rod while the vehicle traverses a laterally slanting course, and means for transmitting the turning motion of the rod to the steering knuckle to thereby automatically steer the vehicle.

4. A device of the character described comprising a vehicle having rear wheels and front steering wheels, driving means for the rear wheels including a suitable motor carried by the vehicle, an appropriate source of energy for the motor also carried by the vehicle, a lever disposed on a contiguous part of the vehicle for readily switching the motive power on and off to start the vehicle while standing still and to stop it while in motion, means upon which the front wheels are mounted including steering knuckles, means connecting them together for a correspondence of motion, a steering rod mounted on the vehicle carrying a weighted pendulum, said pendulum being predominatingly influenced by gravity and the action of centrifugal force when the vehicle traverses a laterally slanting course to thereby turn the rod in one or the other direction, and means for translating the turning movement of the rod to rocking movement of the knuckles and thereby automatically steer the vehicle.

5. A device of the character described comprising a small automobile adapted to be occupied by an animal, wheels at the rear of the automobile and steering wheels at the front, steering means associated with the front wheels, a steering rod journaled on the automobile having a weighted pendulum, means by which the automobile is propelled around a laterally slanting course, the speed of the automobile determining the position of the pendulum in relation to the action of gravity and centrifugal force, means by which the consequent turning of the steering rod is transmitted to the steering means to thereby automatically steer the automobile while traversing the course, and a steering wheel placed on the rod adapted to be grasped by the animal thereby making it appear as tho the automobile were under the control of the animal.

6. A device of the character described comprising an automobile having rear wheels and front steering wheels, a front axle having end yokes disposed at an angle to the perpendicular, means carrying the front wheels including knuckles pivoted in said yokes and assuming a canting position, means connecting the knuckles so that there may be a correspondence of movement of the front wheels, means for driving the automobile, and means for automatically steering the vehicle as it traverses a laterally slanting course, said means including a steering rod journalled longitudinally of the automobile, a weighted pendulum connected to or carried by the rod or attached in any suitable manner whereby it may transmit its motion to the steering wheels either directly or indirectly, said pendulum being predominatingly influenced by gravity and the action of centrifugal forces as the speed of the automobile slackens or increases while traversing said laterally slanting course, to accordingly steer the automobile.

7. A device of the character described comprising an automobile having rear wheels and front steering wheels, a motive power plant carried by the automobile for driving the rear wheels, means for controlling and operating said power plant including a shutoff cock, usual spark and carburetor controls, said shutoff cock being opened only to allow the desired amount of fuel to run down into the carburetor whereby the length in time the motor will run is governed, means upon which the front wheels are mounted including movable steering knuckles, means for automatically turning said knuckles to thereby steer the automobile both upon an increase of speed while the motor is gaining momentum and upon the decrease of speed when the power of the motor is retarded or shut off, said means including a steering member mounted in bearings, a weighted pendulum connected thereto and acted on by gravity and centrifugal forces, and means for transmitting the action of the pendulum to the steering knuckles as said pendulum is affected according to the predominating one of said forces.

8. A device of the character described comprising an automobile having rear wheels and front steering wheels, adaptable for an animal to ride in, a motive power plant carried by the automobile for propelling the automobile while traversing a race track or motordrome, means for automatically stopping said power plant, a weighted pendulum, means for automatically steering said automobile as the weighted pendulum assumes various positions dependent on the combatant gravity and centrifugal forces, said forces being repelled or impelled materially by the speed of the automobile and angle of the incline or the diameter of the traversible curvature of said race track.

9. A device of the character described comprising a vehicle having a dirigible wheel, means carried by the vehicle by which it is propelled, a pendulum which will swing under predominating force of either gravity or centrifugal force, and means operated by the pendulum to cant said wheel in the same direction that the pendulum swings.

10. A device of the character described comprising a vehicle having a dirigible wheel, a power plant carried by the vehicle by which it is propelled, a pendulum which is arranged to swing under certain influences during the motion of the vehicle, and means translating the swinging of the pendulum into a canting of said wheel in the same direction that the pendulum swings.

11. A device of the character described comprising a vehicle having a dirigible wheel and a driving wheel, a power plant for driving the last wheel including a gas engine having an carburetor, a source of fuel supply for the engine including a gasoline tank, means for placing an amount of fuel available for use in the engine before starting including a valve and a tube connected with the carburetor, said engine and vehicle stopping automatically when said amount of fuel is exhausted, means for automatically controlling the dirigible wheel while the vehicle is in motion including a pendulum which swings according to predominating gravity and centrifugal forces and means for transmitting the motion of the pendulum to the dirigible wheel causing the latter to swing in cognizance with the pendulum.

WILLIAM EDWARD SOLDNER.